United States Patent

[11] 3,594,509

[72] Inventor Tadao Shimamura
Tokyo, Japan

[21] Appl. No. 847,622
[22] Filed Aug. 5, 1969
[45] Patented July 20, 1971
[73] Assignee Nippon Electric Company, Limited
Tokyo, Japan
[32] Priority Aug. 6, 1968
[33] Japan
[31] 55290/43

[54] DELTA MODULATOR APPARATUS
10 Claims, 3 Drawing Figs.

[52] U.S. Cl. 179/15 AV, 179/15.55 R, 332/110
[51] Int. Cl. H04j 3/18
[50] Field of Search 179/15.55, 15.55 T, 15 AP, 15 BC, 15 BM, 15 BW; 325/38.1

[56] References Cited

UNITED STATES PATENTS

| | | | |
|---|---|---|---|
| 2,949,505 | 8/1960 | Kretzmer | 179/15.55 |
| 3,471,648 | 10/1969 | Miller | 179/15.55 |
| 3,518,548 | 6/1970 | Greefkes et al. | 179/15 BW |

*Primary Examiner*—Ralph D. Blakeslee
*Assistant Examiner*—David L. Stewart
*Attorney*—Marn & Jangarathis

ABSTRACT: Delta modulator apparatus is provided in accordance with the teachings of the present invention. In one exemplary embodiment of the present invention high-speed delta modulator apparatus is provided wherein a plurality of relatively low speed delta modulator means are arranged so that one of such plurality of low speed delta modulator means adapted to receive an input signal to be modulated while each succeeding one of said plurality of low speed delta modulator means is connected to a preceding one of such plurality of low speed delta modulator means in a manner to receive an error signal therefrom as an input thereto. The plurality of relatively low speed delta modulator means each includes commonly timed coder means whose outputs may be combined in a multiplex manner whereby the resulting modulator apparatus exhibits an equivalent sampling rate equal to the sampling rate of each of said plurality of relatively low speed delta modulator means multiplied by the number of relatively low speed delta modulator means present in said plurality.

INVENTOR.
Tadao Shimamura
BY
Marn & Jangarathis
ATTORNEYS

INVENTOR.
Tadao Shimamura
BY
Marn & Jangarathis
ATTORNEYS

DELTA MODULATOR APPARATUS

This invention relates to high-speed delta modulation communications systems and more particularly to high-speed delta modulator apparatus therefor.

Since the discovery of delta modulation techniques in the early 1950's, it has been evident that delta modulation communications systems possess a plurality of attractive attributes which render them highly advantageous when compared to other pulse communications systems presently in wide use. For instance, if a delta modulation communications system is compared to the well-known forms of pulse code modulation communications systems which are prevalent today, it will be seen that such delta modulation communications systems possess the marked structural advantage that the modulators and demodulators thereof are substantially simplified as compared to those present in conventional pulse code modulation communications systems. Furthermore, while a significant portion of the circuitry present in any pulse code modulation communications system must of necessity be devoted to establishing and maintaining the synchronization thereof, a delta pulse code modulation communications system does not require such synchronization and hence no complex circuitry dedicated thereto is required.

The principal disadvantages attending the use of delta modulation communications systems are that such systems require the use of transmission bands which are wider than those necessitated by other forms of pulse modulation communications systems and that the sampling rate presently required thereby is exceedingly high. Furthermore, the requirements of a wide transmission bandwidth and a high sampling rate are related and result in the uneconomical use of the available transmission band, particularly when the transmission of wide-band signals such as television signals is considered, and complex circuit design criteria, which are often difficult to achieve in conventional modulator apparatus used in conjunction with delta modulation communications systems. Thus, for these reasons, conventional communications systems have generally avoided delta modulation techniques so that the more efficient use of the transmission band and the less onerous design criteria of the modulator apparatus used in other forms of modulation communications systems could be employed. Accordingly, despite attractive advantages, delta modulation communications systems have not played a prominent role in the development of practical, commercial communications systems due to the need for wide transmission bands and high sampling rates which attend their use.

Therefore, it is a principal object of this invention to provide delta modulator apparatus for high-speed delta modulation communications systems employing relatively low-speed sampling rates. Various other objects and advantages of the present invention will become clear from the following detailed description of an exemplary embodiment thereof, and the novel features will be particularly pointed out in conjunction with the appended claims.

In accordance with the present invention, modulator apparatus for high-speed delta modulation systems is provided wherein a plurality of relatively low-speed delta modulator means are arranged so that one of such plurality of low-speed delta modulator means is adapted to receive an input signal to be modulated while each succeeding one of said plurality of low-speed delta modulator means is connected to a preceding one of said plurality of low-speed delta modulator means in a manner to receive an error signal therefrom as an input thereto, each of said plurality of relatively low-speed delta modulator means including commonly timed coder means whose outputs may be combined in a multiplex manner whereby the resulting modulator apparatus exhibits an equivalent sampling rate equal to the sampling rate of each of said plurality of relatively low-speed delta modulator means multiplied by the number of relatively low-speed delta modulator means present in said plurality.

The invention will be more clearly understood by reference to the following detailed description of an exemplary embodiment thereof in conjunction with the accompanying drawings in which.

Figure 1:
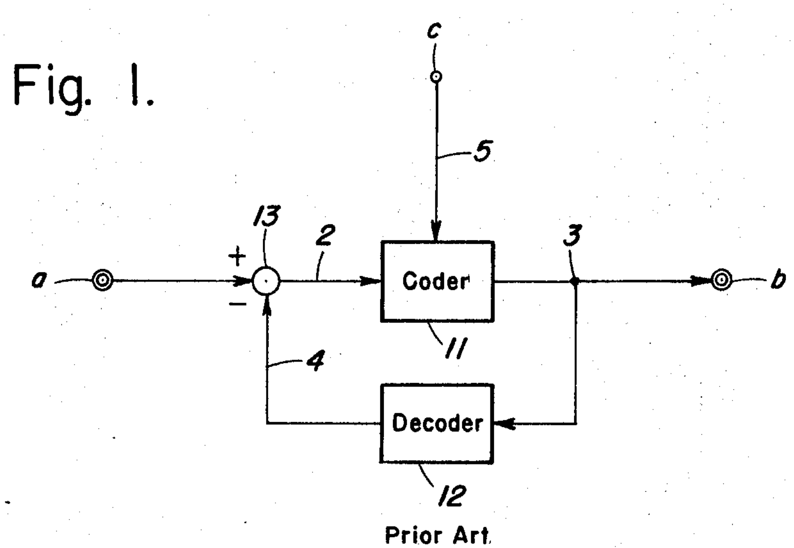
Fig. 1. Prior Art
FIG. 1 is a block diagram serving to schematically illustrate conventional delta modulator apparatus.

Referring now to the drawings and more particularly to FIG. 1 thereof, there is shown a block diagram which serves to schematically illustrate a typical form of conventional delta modulator apparatus. As shown in FIG. 1 the conventional delta modulator apparatus comprises coder means 11, decoder means 12 and subtractor means 13. The coder means 11 may take the form of a conventional 1-bit coder circuit which acts in the well-known manner to discriminate between positive and negative values of input signals applied thereto and produce in response to said input signals positive and negative output pulses, respectively, whose amplitudes are constant, at a rate determined by sampling pulses applied to a timing input thereto. The input signals applied to said coder means 11 are applied through the conductor 2, which is connected to the output of the subtractor means 13, and the sampling signals are applied thereto from an external source which connects to terminal *c* through conductor 5. The output of the coder means 11 is applied through the conductor 3 to the output terminal means *b* of the illustrated delta modulator apparatus and to an input of the decoder means 12 in the manner shown in FIG. 1. The decoder means 12 may take, in the simplest case, the form of an integrator circuit which acts in the well-known manner to integrate the bipolar pulse output of the coder means 11 and thus derive therefrom the input waveform to the illustrated delta modulator apparatus. The output of the decoder means 12 is connected through conductor 4 to an input of the subtractor means 13. The subtractor means 13 may take the form of a conventional difference circuit which acts in the well-known manner to provide an output signal representative of the difference between first and second input signals applied thereto. A first input to the subtractor means 13 is applied thereto from input terminal means *a* which represents the input to the conventional delta modulator apparatus depicted in FIG. 1. The second input of the subtractor means 13 is applied through conductor 4 from the output of the decoder means 12. Accordingly, as the first input signal is the input signal to be modulated and the second input signal represents the decoded output signal of the illustrated delta modulator apparatus, it will be seen that the output signal of the subtractor means, being the difference therebetween, is representative of the error signal of the conventional delta modulator apparatus shown in FIG. 1.

In the operation of the conventional delta modulator apparatus depicted in FIG. 1, input signals to be delta modulated are applied to the input terminal means *a* and sampling signals, having an appropriate repetition rate, are applied to the input terminal means *c*. The input signals applied to the input terminal means *a* are further applied to the first input of the subtractor means 13 which also receives, as a second input thereto, the output from the decoder means 12. The output of the subtractor means 13 is applied through conductor 2 to the input of the coder means 11 which acts, as aforesaid, on the error signal applied thereto to discriminate such error signals and produce in response thereto positive and negative output pulses of constant amplitudes at a rate determined by the repetition rate of the sampling signals applied to the input terminal means *c*. The output of the coder means 11, which takes the form of a bipolar pulse train, is applied through the conductor 3 to the output terminal means *b* for transmission to the receiving portions of the delta modulation communications system and to the input of the decoder means 12 wherein the same is integrated and applied to the second input of the subtractor means 13 so that an error signal may be derived.

The foregoing simplified explanation of the operation of the conventional delta modulator apparatus illustrated in FIG. 1 has proceeded on the assumption that the input signals applied to the input terminal means *a* and the sampling signals applied to the input terminal means *c* are of such character that the coder means 11, the decoder means 12 and the subtractor means 13 will operate normally to provide their requisite circuit functions within the depicted apparatus. This assumption, however, is not always the case when said input signals comprise wide-band signals as in practical delta modulator apparatus, of the type shown in FIG. 1, it is often extremely difficult to design circuit components capable of operating at the sampling rates required by such wide-band signals. For instance, as present commercial television signals, industrial television signals and the like have signal bandwidths which range from 3MHz. to 5MHz.; video signals of this nature applied to the input terminal means *a* would require that sampling signals having a frequency of at least 100MHz. be applied to the input terminal means *c* for such video signals to be appropriately transmitted by a delta modulation communications system employing conventional delta modulation apparatus of the form illustrated in FIG. 1. However, from a practical standpoint circuitry capable of properly operating at such high sampling rates is difficult to achieve, even when advanced circuit techniques are employed, and operation at such high sampling rates invariably causes operating stability to be impaired.

Figure 2:
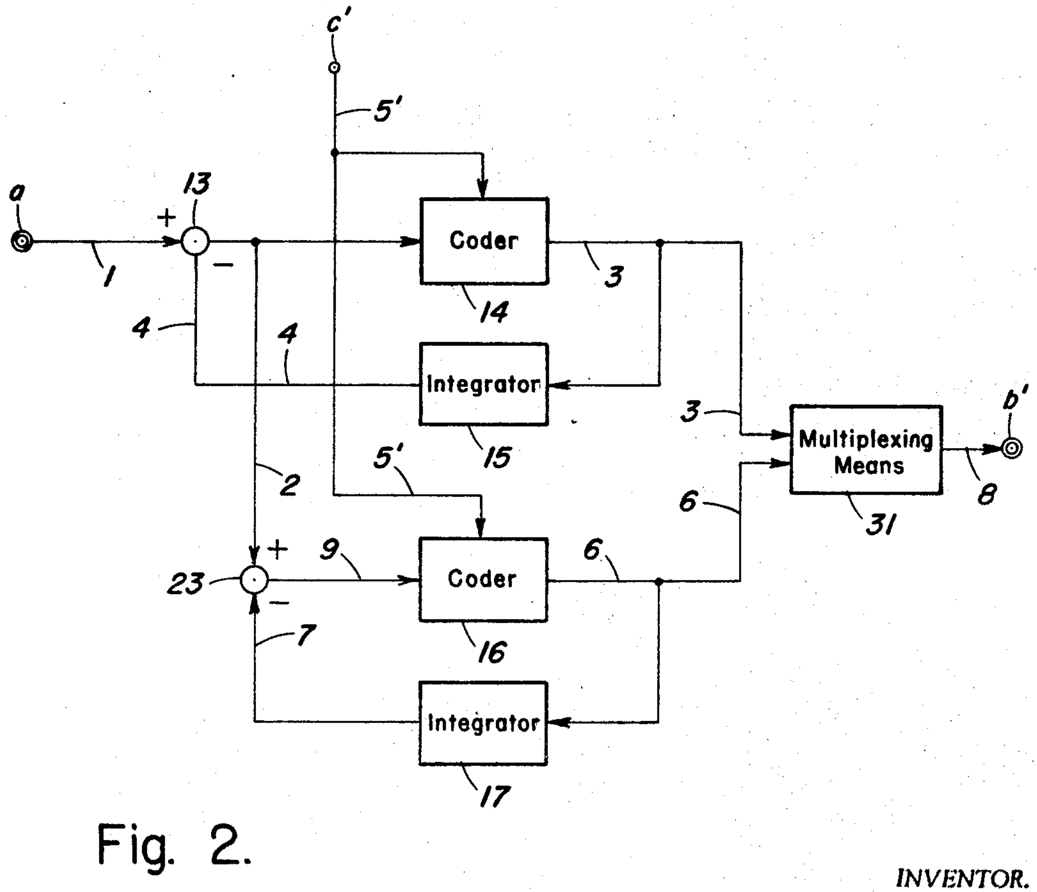
FIG. 2 is a block diagram schematically showing an embodiment of the delta modulator apparatus according to the present invention.

Turning now to FIG. 2, there is shown a block diagram which serves to schematically illustrate an exemplary embodiment of the delta modulator apparatus according to the present invention. As the embodiment of this invention illustrated in FIG. 2 includes a plurality of circuit elements which are common to the conventional delta modulator apparatus shown in FIG. 1, where applicable, like elements have retained previously utilized reference numerals so that the continuity of the descriptive portion of this specification may be maintained. Accordingly, where such common elements appear in FIG. 2, the description of the structure and elemental functions thereof will be made by way of a direct reference to the conventional delta modulator apparatus shown in FIG. 1 as reiteration of such structure and elemental functions is considered unnecessary.

The exemplary embodiment of the delta modulator apparatus according to the present invention, as shown in FIG. 2, comprises first and second coder means 14 and 16, first and second integrator means 15 and 17, first and second subtractor means 13 and 23 and multiplexing means 31. The first and second coder means 14 and 16 may each take the form of a conventional one-bit coder circuit of the type described above with reference to the coder means 11 shown in FIG. 1. The first and second coder means 14 and 16 thus act in the well-known manner to discriminate between positive and negative values of input signal applied thereto and produce as a result of such discrimination, positive and negative output pulses, respectively, whose amplitudes are constant at rates determined by sampling pulses applied to timing inputs thereto. The timing inputs to each of said first and second coder means 14 and 16 are commonly connected, as shown in FIG. 2, to the input terminal *c'* through the conductor 5'. As shall be seen below, the input terminal *c'* is here adapted to be connected to an external source of sampling signals which acts to set the sampling rate of each of the first and second coder means 14 and 16. The input signals applied to the first coder means 14 are applied thereto through the conductor 2 which is connected to the output of the first subtractor means 13 while the input signals applied to the second coder means 16 are coupled thereto through the conductor 9 connected to the output of the second subtractor means 23. The output of the first coder means 14 is connected through the conductor 3 to a first input of the multiplexing means 31 and in addition thereto is connected to the input of the first integrator means 15. Similarly, the output of the second coder means 16 is connected through the conductor 6 to a second input of the multiplexing means 31 and to the input of the second integrator means 17. The multiplexing means 31 may take the form of a conventional multiplexing circuit which acts in the well-known manner to multiplex the input pulses applied thereto on a bit by bit basis. As the exemplary embodiment of the delta modulator apparatus shown in FIG. 2 includes only two discrete inputs to the multiplexing means 31, the multiplexing means 31 may be here considered to act upon the input pulses present in the first and second inputs thereto in alternating sequence whereupon such input signals are combined at the output thereof in an alternating sequence. The output of the multiplexing means 31 is connected through the conductor 8 to the terminal means *b'* which here acts as the output means for the delta modulator apparatus illustrated in FIG. 2.

The first and second integrator means 15 and 17 may take the form of conventional decoder circuit means which act in the well-known manner to integrate the bipolar pulse output of the first and second coder means 14 and 16, respectively, associated therewith to derive a decoded form of the input waveform applied thereto. In the embodiment of this invention illustrated in FIG. 2, the operation of the first and second integrator means 15 and 17 are described in conjunction with the waveforms illustrated in FIG. 3 as if said first and second integrator means 15 and 17 constituted local decoder means of the single integration type. This form of integrator means has been selected in the instant embodiment because the type of decoder means relied upon forms no part of the present invention per se and hence the selection of the simplest form of local decoder means may be relied upon to substantially simplify the explanation of the present invention set forth herein. However, although the embodiment of the invention set forth in FIG. 2 is disclosed in a manner wherein the first and second integrator means 15 and 17 act as local decoders of the single-integration type, to simply integrate the bipolar pulse output of the first and second coder 14 and 16, respectively, associated therewith; it will be appreciated by those of ordinary skill in the art that any well-known form of local decoder circuit may be substituted for the first and second integrator means 15 and 17 and that those forms of decoder circuits acting under dual-integration principles, predicting principles or other conventional principles are specifically contemplated. The first and second integrator means 15 and 17 illustrated in FIG. 2 should be designed or selected such that their operating characteristics are similar and particularly so that the length of the step response provided thereby, or the level interval at which the output of the first and second integrator means 15 and 17 is decreased or increased when a single input code pulse is applied thereto is the same. The output of the first integrator means 15 is connected through conductor 4 to a second input to the first subtractor means 13 in a similar manner to that illustrated in the conventional delta modulator apparatus shown in FIG. 1, while the output of the second integrator means 17 is connected through conductor 7 to a second input of the second subtractor means 23.

The first and second subtractor means 13 and 23 may each take the same form and perform the same functions as the subtractor means 13 previously described in conjunction with FIG. 1. A first input to the first subtractor means 13 is applied thereto from the input terminal means *a* which represents the input to the embodiment of the delta modulator apparatus illustrated in FIG. 2 and hence may receive video signals or any other form of input signal to be modulated prior to transmission. The second input to the first subtractor means 13 is connected to the output of the first integrator means 15 so that said first subtractor means 13 receives first and second input signals representing the signal to be modulated and the decoded output signal of the first coder means 14, respectively, and produces in response thereto an output error signal representative of the difference therebetween. The output of the first subtractor means 13 is connected through the conductor 2 to the input of the first coder means 14 and to a first input of the second subtractor means 23. In addition, a second input to the second subtractor means 23 is connected through the conductor 7 to the output of the second integrator means 17. The second subtractor means 23 thus receives at the first and second inputs thereto a first input signal representative of the error signal applied as an input to the first coder means 14 and a second input signal representative of the decoded output of the second coder means 16. The second subtractor means 23, thereby acts in the well-known manner to produce an error output signal representative of the difference between the input to the first coder means 14 and the decoded output of the second coder means 16 and such error output signal is applied, as aforesaid, to the input of the second coder means 16 through the conductor 9.

As may be appreciated from the symmetrical structural relationship existing in the embodiment of this invention illustrated in FIG. 2, the delta modulator apparatus according to the present invention includes first delta modulator means formed by the first subtractor means 13, the first coder means 14 and first integrator means 15 and second delta modulator means formed by the second subtractor means 23, the second coder means 16 and the second integrator means 17. The first and second delta modulator means thus present in the FIG. 2 embodiment of the present invention are interconnected in such a manner that each of said first and second delta modulator means is commonly timed by sampling signals applied to the input terminal $c'$ and the error signals applied to the first coder means 14, present in the first delta modulator means, are applied as input signals to the first input of the second subtractor means 23 of the second delta modulator means. As shall be seen hereinafter, since the outputs of each of the first and second delta modulator means are combined into a multiplex waveform by the operation of the multiplexing means 31, the sampling rate of each of the first and second modulator means may be one-half of that required in the conventional delta modulator apparatus illustrated in FIG. 1 for the same form of input signals applied and hence the repetition rate of the sampling signals applied to the input terminal $c'$ of the delta modulator apparatus shown in FIG. 2 need only be one-half that required to be applied to the input terminal $c$ of the conventional delta modulator apparatus shown in FIG. 1. Furthermore, although only two interconnected delta modulator means have been shown in the exemplary embodiment of the delta modulator apparatus illustrated in FIG. 2 so that the explanation thereof could proceed in a simplified manner, without the introduction of repetitive structure thereto, it will be appreciated that in general any number $n$ of delta modulator means may be present therein and interconnected in the manner shown wherein each such delta modulator means is commonly timed and receives as an input signal thereto the error signal derived from the preceding delta modulator means. In addition, as may be seen from the operation of the embodiment of the invention illustrated in FIG. 2, as set forth below, where there are $n$ delta modulator means present in a given embodiment of the present invention, the sampling rate of each of the delta modulator means present therein will be $1/n$th the sampling rate of that necessary for the conventional delta modulator apparatus illustrated in FIG. 1 while the equivalent sampling rate for such given embodiment of the present invention will be the same as that exhibited by said conventional delta modulator apparatus.

The operation of the exemplary embodiment of the delta modulator apparatus according to the present invention, as illustrated in FIG. 2, will be set forth below in conjunction with FIG. 3 which depicts the waveforms present at various portions of the illustrated embodiment of the instant invention during the operation thereof. Accordingly during the explanation of the present invention which follows, the reader will be periodically referred to specific waveforms illustrated in FIG. 3 so that the function of the circuit component being described will be fully appreciated.

In the operation of the embodiment of the invention illustrated in FIG. 2, an input signal which may take the form of a video signal or and other signal to be modulated is applied to the input terminal means $a$ and sampling pulses having an appropriate repetition rate, supplied from an external source not shown herein, are applied to the input terminal $c'$. The input signals applied to the input terminal means $a$ may here be considered to take the form of video signals, a portion of whose waveform is illustrated by the waveform 1′ in FIG. 3. The input signals thus applied to the input terminal means $a$ are further applied through the conductor 1 to the first input of the first subtractor means 13 which also receives, as aforesaid, at the second input thereof, the output of the first integrator means 15 applied thereto by the conductor 4. The second input to the first subtractor means 13, applied thereto by the conductor 4, is illustrated in FIG. 3 by the waveform 4′. The first subtractor means 13 acts in the well-known manner on the first and second input signals applied thereto to derive therefrom an error signal representative of the difference therebetween. The output of the first subtractor means 13, as shown by the waveform 2′ in FIG. 3, is applied through the conductor 2 to the input of the first coder means 14. The first coder means 14, as indicated above, acts on the error signal applied thereto to discriminate such error signal as to positive and negative values and produce in response thereto positive and negative output pulses of a constant magnitude whose rate is determined by the repetition rate of the sampling signals applied to the input terminal $c'$ and applied to the timing input thereof through the conductor 5′. The output of the first coder means 14, which may be considered to take the form of the bipolar pulse train 3′, as shown in FIG. 3, is applied through the conductor 3 to the first input of the multiplexing means 31 and to the input of the first integrator means 15. As the first integrator means 15 has been here assumed to take the form of a decoder circuit of the single-integration type, the bipolar pulse train 3′ applied thereto is integrated and thus the integrated pulse train is applied to the second input of the first subtractor means 13, through the conductor 4, in the form of waveform 4′ shown in FIG. 3. Therefore, as the first subtractor means 13 receives first and second input signals representative of the input signal to be modulated and the decoded output of the first coder means 14, respectively, and derives therefrom an output error signal representative of the difference therebetween for application to the first coder means 14; it will be appreciated that the operation of the first delta modulator means present in the embodiment of the delta modulator apparatus of this invention as illustrated in FIG. 2 is similar to that of the conventional delta modulator apparatus shown in FIG. 1.

The error output signal produced by the first subtractor means 13, as shown by the waveform 2′, is additionally applied through the conductor 2 to the first input of the second subtractor means 23 of the second delta modulator means present in the delta modulator apparatus shown in FIG. 2. Thus, the error signal of the first delta modulator means present in the embodiment of the invention illustrated in FIG. 2 serves as the input signal to the second demodulator means present therein. Since the operation of the second delta modulator means present in the embodiment of the invention illustrated in FIG. 2 is similar to the operation of the first delta modulator means present therein, it will be appreciated that the second subtractor means 23 receives error input signals from the output of the first subtractor means 13 as a first input thereto and output signals from the second integrator means 17, through the conductor 7, at the second input thereof wherein the waveform of the second input to the second subtractor means is illustrated by waveform 7′ in FIG. 3. Furthermore, although the output of the first subtractor means 13 shown in FIG. 2 is illustrated in FIG. 2 as being directly applied to the first input of the second subtractor means 23, it should be understood that the operation of the second delta modulator means present in the embodiment of the invention shown in FIG. 2 may be rendered more stable by applying the error signal from the first delta modulator means to the first input of the second subtractor means 23 through a low-pass filter so that the sampling frequency component of the error signal may be removed thereby.

The second subtractor means 23 is thus in receipt of the error signal of the first delta modulator means at the first input thereof and the output of the second integrator means 17 at the second input thereto and thereby acts in the previously described manner to produce a second error output signal representative of the difference therebetween. The output of the second subtractor means 23 is applied through conductor 9 to the input of the second coder means 16. As the second coder means 16 is connected through the conductor 5' to the input terminal means *c'* in the same manner as was the first coder means 14, the second coder means 16 acts to discriminate the second error signals applied thereto as to positive and negative values and as a result of such discrimination produces positive and negative output pulses, respectively, having a constant magnitude at a rate determined by the repetition rate of the sampling signals applied to the input terminal *c'*. Thus, the first and second coder means 14 and 16 operate at the same sampling rate as determined by the repetition rate of the sampling signals applied to the input terminal *c' which sampling rate is equal to one-half of that exhibited by the coder means 11 illustrated in the conventional delta modulator apparatus shown in FIG. 1. The output of the second coder means 16, illustrated by the bipolar waveform 6'* in FIG. 3, is applied through the conductor 6 to the second input of the multiplexing means 31 and to the input of the second integrator means 17. The second integrator means 17, as stated above, is selected to have the same characteristics as the first integrator means 15 and may therefore be considered to take the form of a decoder circuit of the single-integration variety whose length of step or level interval is increased or decreased in response to a single-code pulse in the same manner as that of the first integrator means 15. The second integrator means 17 thus acts to integrate the bipolar output pulses 6' present at the output of the second coder means 16 and supply such integrated output, as shown by the waveform 7' in FIG. 3, to the second input of the second subtractor means 23 through the conductor 7. Thus it will be seen that the second subtractor means 23 receives the error signal of the first delta modulator means present in the delta modulator apparatus of the instant invention at a first input thereto, receives the integrated output of the second coder means 14 at a second input thereto and produces an output signal equal to the error signal of the second delta modulator means present in the delta modulator apparatus according to the present invention. Since the exemplary embodiment of the delta modulator apparatus according to the present invention includes only first and second delta modulator means, the error output signal from the second subtractor means 23 is applied only to the input of the second coder means 16'; however, if an embodiment of this invention were illustrated wherein a third delta modulator stage were present, the error output signal from the second subtractor means would additionally be applied to a first input to the subtractor means present in that stage.

Figure 3:
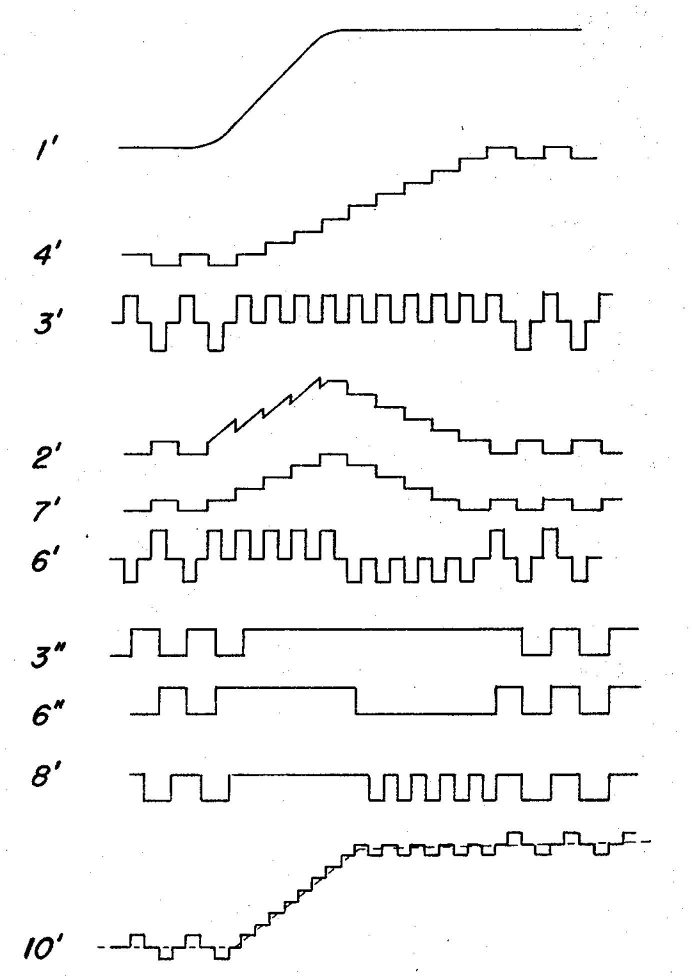
FIG. 3 is a graphical representation illustrating waveforms present at various portions of the block diagram of the embodiment of this invention shown in FIG. 2.

As was stated above, the outputs of the first and second coder means 14 and 16, illustrated by the waveforms 3' and 6' in FIG. 3, are applied to the first and second inputs, respectively, of the multiplexing means 31. The multiplexing means 31 acts in the well-known manner to combine the bipolar output pulse trains of the first and second coder means 14 and 16 in a bit by bit time division sequence wherein the pulses applied to the first input thereof by the conductor 3 are allocated first time slots in the output of the multiplexing means 31 and corresponding pulses applied to the second input of said multiplexing means 31 are allocated second time slots. The multiplexing means 31 has been relied upon in the embodiment of this invention illustrated in FIG. 2 because serial transmission is contemplated thereby; however, as will be obvious to those of ordinary skill in the art, should an embodiment of the present invention be utilized in a parallel transmission system, the multiplexing means 31 may be omitted and the outputs of each of the *n* coder means relied upon therein directly transmitted. In the operation of the multiplexing means 31, the pulse trains applied to the first and second inputs thereto, indicated by waveforms 3' and 6', are initially converted into unipolar, NRZ signals, shown by waveforms 3'' and 6'', respectively, in FIG. 3, and then such unipolar, NRZ signals are multiplexed into a pulse train, as indicated by waveform 8'' of FIG. 3, having a repetition frequency equal to twice the frequency of such unipolar, NRZ signals and twice the repetition frequency of the sampling signals applied to each of the delta modulator means formed therein. The output of the multiplexing means 31 is applied through the conductor 8 to the output terminal means *b'* from where the resultant multiplex pulse train may be transmitted as an NRZ signal.

At the receiving portion of a delta modulator communications system, not shown herein, the coded multiplexed pulse train received may be decoded by integrator means having the same characteristics as the first and second integrator means 15 and 17 illustrated in FIG. 2. Thereafter, the integrated waveform of such transmitted NRZ signals may be applied to a low-pass filter means whereby the fundamental frequency band component of the original signal applied to the input terminal means *a* may be recovered. The integrated waveform of transmitted NRZ signals is illustrated by the solid portion of waveform 10' in FIG. 3 while the fundamental recovered therefrom by passing said integrated waveform through a low-pass filter means is indicated by the dashed portion of waveform 10'. As an alternative to the foregoing receiving and decoding operation, which is readily available in cases where a single decoder means present in the receiving portion of the delta modulation communications system is not capable of operating upon a signal having a frequency as high as that of the output of the multiplexing means 31, the multiplexed signal received may be divided into two pulse trains and separately operated upon by individual decoders whose outputs may then be added to again derive the original signal. Furthermore, even when such alternative receiving and decoding operation is utilized, so long as each of the individual decoder means exhibit the same electrical characteristics, no particular synchronizing signal will be required. Therefore, it will be seen that the delta modulator apparatus according to the present invention exhibits an equivalent sampling frequency which is sufficiently high to allow the transmission of wideband signals while allowing each of the delta modulator means present therein to operate at relatively low frequencies which are readily within the normal capabilities of the circuit components present therein.

Although the delta modulator apparatus according to the present invention has been disclosed in conjunction with the exemplary embodiment thereof illustrated in FIG. 2, many modifications and alterations will be obvious to those of ordinary skill in the art. For instance, delta modulator apparatus may be formed in accordance with the teachings of the present invention containing any number *n* of delta modulator means therein and each such delta modulator means thus present will operate at 1/*n*th of the desired sampling frequency while the delta modulator apparatus formed as a whole will exhibit an equivalent sampling frequency equal to that desired. Furthermore although the present invention has been disclosed in conjunction with an exemplary embodiment thereof which relies upon decoder means of the single integration variety, it will be apparent that any known form of decoder means may be utilized without any deviation from the teachings of the present invention.

While the invention has been described in connection with an exemplary embodiment thereof, it will be understood that many modifications will be readily apparent to those of ordinary skill in the art; and that this application is intended to cover any adaptations or variations thereof. Therefore, it is manifestly intended that this invention not be limited to the exemplary embodiment shown herein.

What I claim is:

1. Delta modulator apparatus comprising:

a plurality of delta modulator stages adapted to receive an input signal and produce in response thereto a coded pulse train output representative of the input signal received, each of said plurality of delta modulator stages including means for deriving an error signal equal to the difference between said coded pulse train output representative of the input signal received and the actual input signal received and means for coding said error signal to thereby produce said coded pulse train;

means for applying a signal to be modulated to one of said plurality of delta modulator stages as an input signal thereto and means for applying to each of said plurality of delta modulator stages other than said one stage an error signal derived in an associated preceding one of said plurality of delta modulator stages as an input signal thereto; and means for accepting said coded pulse train output of each of said delta modulator stages and preparing the same for transmission.

2. The delta modulator apparatus according to claim 1 wherein said means for accepting said coded pulse train output of each of said delta modulator stages includes multiplexing means for converting each of said coded pulse train outputs into a resultant high speed multiplexed pulse train.

3. The delta modulator apparatus according to claim 2 wherein said means for applying to each of said plurality of delta modulator stages other than said one stage an error signal derived in an associated preceding one of said plurality of delta modulator stages as an input signal thereto comprises means for connecting each of said plurality of delta modulator stages other than said one stage to a delta modulator stage immediately preceding such delta modulator stage.

4. The delta modulator apparatus according to claim 3 wherein each of said plurality of delta modulator stages other than said one stage is connected to said immediately preceding delta modulator stage through low-pass filter means, said low-pass filter means acting to remove sampling frequency components present in said error signal.

5. The delta modulator apparatus according to claim 3 wherein each of said plurality of delta modulator stages comprises subtractor means, coder means and integrator means.

6. The delta modulator apparatus according to claim 5 wherein an output of said coder means is connected to said integrator means at an input thereof, an output of said integrator means is connected to said subtractor means at one input thereto, an output of said subtractor means is connected to an input of said coder means and another input of said subtractor means is adapted to receive an input signal.

7. The delta modulator apparatus according to claim 6 wherein said coder means are each commonly connected to means for providing sampling signals thereto and said outputs of each of said coder means are additionally connected to said multiplexing means at discrete inputs thereto.

8. The delta modulator apparatus according to claim 7 wherein said multiplexing means acts to convert said coded pulse train outputs applied to each of the discrete inputs thereto into said resultant high-speed multiplexed pulse train wherein time slots are assigned on a bit by bit basis.

9. The delta modulator apparatus according to claim 8 wherein said delta modulator apparatus exhibits an equivalent sampling rate equal to the sampling rate of each of said plurality of delta modulator stages multiplied by the number of delta modulator stages in said plurality.

10. The delta modulator apparatus according to claim 9 wherein each of said integrator means exhibits closely matched electrical characteristics.